United States Patent [19]
Haner

[11] Patent Number: 5,686,805
[45] Date of Patent: *Nov. 11, 1997

[54] REPULSION MOTOR

[76] Inventor: Lambert Haner, 1975 Wynwood Dr., Rocky River, Ohio 44116

[*] Notice: The term of this patent shall not extend beyond the expiration date of Pat. No. 5,491,398.

[21] Appl. No.: 535,339

[22] Filed: Sep. 28, 1995

Related U.S. Application Data

[63] Continuation of Ser. No. 305,575, Sep. 14, 1994, Pat. No. 5,491,398, which is a continuation of Ser. No. 37,246, Mar. 26, 1993, Pat. No. 5,424,625.

[51] Int. Cl.$^6$ .................................................. H02P 1/24
[52] U.S. Cl. .......................... 318/725; 318/254; 318/138; 318/724
[58] Field of Search .................................. 318/725, 724, 318/254, 138, 439, 726, 696

[56] References Cited

U.S. PATENT DOCUMENTS

| | | | |
|---|---|---|---|
| 1,122,490 | 12/1914 | Flynn | 318/725 |
| 1,205,937 | 11/1916 | Rouzet | 318/725 |
| 1,624,378 | 6/1927 | Weber | 318/725 |
| 2,524,035 | 10/1950 | Bardeen et al. | 179/171 |
| 2,569,347 | 9/1951 | Shockley | 332/52 |
| 3,003,095 | 10/1961 | Barnes | 318/725 |
| 3,603,161 | 9/1971 | Schwarz | 74/5.6 |
| 3,633,084 | 1/1972 | Rakes | 318/254 |
| 3,667,011 | 5/1972 | Casaday et al. | 318/138 |
| 3,667,018 | 5/1972 | Rakes | 318/254 |
| 3,900,780 | 8/1975 | Tanikoshi | 318/254 |
| 3,917,988 | 11/1975 | Payne | 318/138 |
| 4,005,347 | 1/1977 | Erdman | 318/254 |
| 4,156,169 | 5/1979 | Imamura | 318/616 |
| 4,158,795 | 6/1979 | Tarumi et al. | 318/138 |
| 4,160,200 | 7/1979 | Imamura et al. | 318/616 |
| 4,169,990 | 10/1979 | Lerdman | 318/138 |
| 4,184,107 | 1/1980 | Turini et al. | 318/467 |
| 4,227,133 | 10/1980 | Imamura | 318/616 |
| 4,228,396 | 10/1980 | Palombo et al. | 324/163 |
| 4,311,933 | 1/1982 | Riggs et al. | 310/156 |
| 4,375,049 | 2/1983 | Chavin | 318/696 |
| 5,059,876 | 10/1991 | Shah | 318/254 |

FOREIGN PATENT DOCUMENTS 2510836  7/1981  France .

OTHER PUBLICATIONS

European Search Report dated Dec. 29, 1995.

*Primary Examiner*—Karen Masih
*Attorney, Agent, or Firm*—Vickers, Daniels & Young

[57] ABSTRACT

A brushless repulsion motor in which the rotor carries electronic switch circuits for selectively shorting the rotor windings at appropriate times in its rotational cycle. A non-contact reference signal source on the stator enables the electronic circuitry to operate as desired. The disclosed motor arrangements are useful as substitutes for conventional brush-type repulsion motors, universal series motors, synchronous motors, servomotors and stepping motors.

2 Claims, 5 Drawing Sheets

REPULSION MOTOR

This is a continuation, of application Ser. No. 08/305,575 filed Sep. 14, 1994, now U.S. Pat. No. 5,491,398 which in turn is a continuation of U.S. Ser. No. 08/037,246, filed Mar. 26, 1993, now U.S. Pat. No. 5,424,625, issued Jun. 13, 1995.

BACKGROUND OF THE INVENTION

The invention relates to improvements in electric motors and, in particular, to an improved repulsion-type motor.

PRIOR ART

A conventional repulsion motor is typically constructed with a single phase stator and a DC rotor with an armature winding connected to a commutator. Diametrally opposed carbon brushes riding on the commutator are shorted together but are not connected directly to the AC line power. When AC power is applied to the stator winding, currents are induced in the armature to create the rotor field. Important advantages possessed by the repulsion motor are relatively high values of starting torque with comparatively low starting current, ability to sustain high starting torques for long periods of time such as may exist under conditions of high inertia loads, and adaptability to wide range speed control.

The speed torque curve of a repulsion motor is similar to that of a universal series motor or a series-type DC motor. The no-load speed of the repulsion motor can be many times higher than the synchronous speed. A major problem with the conventional repulsion motor from the standpoint of practical application is that the brushes and commutator wear out quickly because of the arcing and heat generated by the brushes in contact with the commutator. Today, basic repulsion motors are not commonly used because of this serious brush wear problem. Other motor types have been designed attempt to minimize these problems. For example, a repulsion start, induction-run motor is designed with a squirrel cage rotor embedded in the wound armature. Mechanical means are used to lift the brushes from the commutator when the rotor speed reaches a predetermined value and the motor then runs as an induction motor. This is done to develop a very high starting torque for the induction motor.

SUMMARY OF THE INVENTION

The invention involves a motor construction that exhibits the desirable characteristics of a brush-type repulsion motor but eliminates the conventional brushes of such a motor and their recognized disadvantages. In accordance with the invention, electronic switching means is carried on the rotating armature to short individual coils at appropriate times in a cycle of rotation to eliminate the need for brush and commutator elements.

In the disclosed embodiments, the electronic switching means is in the form of power semi-conductors carried on the rotating armature. More specifically, one electronic switch circuit is provided for replacing the switch and current carrying function of one pair of oppositely disposed commutator segments or bars. Any electrical power needed to energize the electronic switching means and any related control circuitry on the armature is produced on the armature by induction from the stator field.

The control electronics on the armature includes means to sense the angular position of the armature relative to the stator in order to control the actuation of the electronic switches.

The control circuitry is operative when a coil is at a predetermined angular position, relative to the stator, to switch an appropriate electronic switch to short the ends of an associated coil together. The result of this short is essentially the same as that achieved in the prior art by a pair of opposed shorted brushes.

Where the control circuitry on the rotor senses a reference point associated with the stator, the reference point or marker can be moved to different angular locations relative to the stator to change torque, speed and/or direction of the rotor. By electronically controlling the location of the reference point or marker to control torque magnitude and direction, a servomotor can be made. A significant advantage, here, is that a power amplifier is not necessary since the motor is connected directly to the AC power line.

In a motor of the disclosed repulsion design, the power electronics need only control the connections in the armature. Therefore, a large amount of mechanical power developed by the motor is controlled with power electronics that is relatively small in power handling capacity. For example, in terms of power handling capacity, the power electronics can conceivably be one-fifth to one-tenth the size of an inverter unit that would be required to drive a conventional induction motor of equivalent motor power output. The brushless repulsion motor offers other advantages. For instance, in conventional practice with an inverter powered motor, the line power must be rectified and converted to DC power and then reconverted or "inverted" to control the AC power for the motor. When the AC line power is rectified with a capacitor input filter, the line current is not sinusoidal but, rather, is pulsed. This creates line harmonics and also a different RMS value. This different form factor and RMS value will heat line fuses differentially and, generally, the fuse line must be derated by 20–25% of its ampere capacity. With the brushless repulsion motor of the invention, a double conversion is not necessary and the line current of the motor is sinusoidal.

Application of the brushless repulsion motor to replace universal series motors has the additional advantage of not having any exposed active electrical parts. This means less of an electrical shock hazard to the user of equipment such as hand tools.

Many other performance advantages and/or features accrue to the brushless repulsion motor as compared to conventional AC and DC motor designs. The electronic switch can be designed such that its opening and closing is modulated by factors other than relative position between the rotor and stator. This capability allows the design of special or tailored speed/torque curves. This capability can also provide for a more efficient conversion of energy on start-up which lowers start-up currents and thereby eliminates the need to employ separate electronic "reduced voltage" start-up controls found in many industrial applications and which are added items of expense.

With regard to the use of the brushless repulsion motor as a servomotor, its performance characteristics are exceptionally good with respect to dynamic response. With the brushless repulsion motor, only a part of the total amount of electrical power is contained in the rotor/armature, therefore the electronics need not process all of the electrical power. By contrast, in a permanent magnet DC servomotor known in the art, all of the electrical power must enter and be processed through the armature by an external electronic power control or amplifier. The electrical time constant of the armature is a dominant factor that limits the dynamic response. In modern high performance AC servos an induction motor is used with a control algorithm referred to as "flux vector control" or "field oriented control". All of the electrical power is supplied by an external power amplifier or inverter and the control calculates the relative position of the stator field to the rotor field to provide optimum control response. Here again, the limitations involve the rotor electrical time constants and the stator electrical time constants. Also, the torque in the brushless repulsion motor, is developed by a change in relative position of the rotor field and stator field. Changing this position requires only to change an external reference marker position and this can be done in many ways that are extremely fast. For example, photodiodes and phototransistors can be used to change the position of the reference marker. The electrical time constant of the rotor/armature is also a diminished factor because not all of the windings are switched at the same time and this creates, in effect, a reduced time constant.

The principles of the invention can be applied, for example, to a brushless repulsion motor with universal-series motor characteristics, to a servomotor, to a synchronous motor and to a stepping motor.

DESCRIPTION OF THE PREFERRED EMBODIMENT

Figure 1:
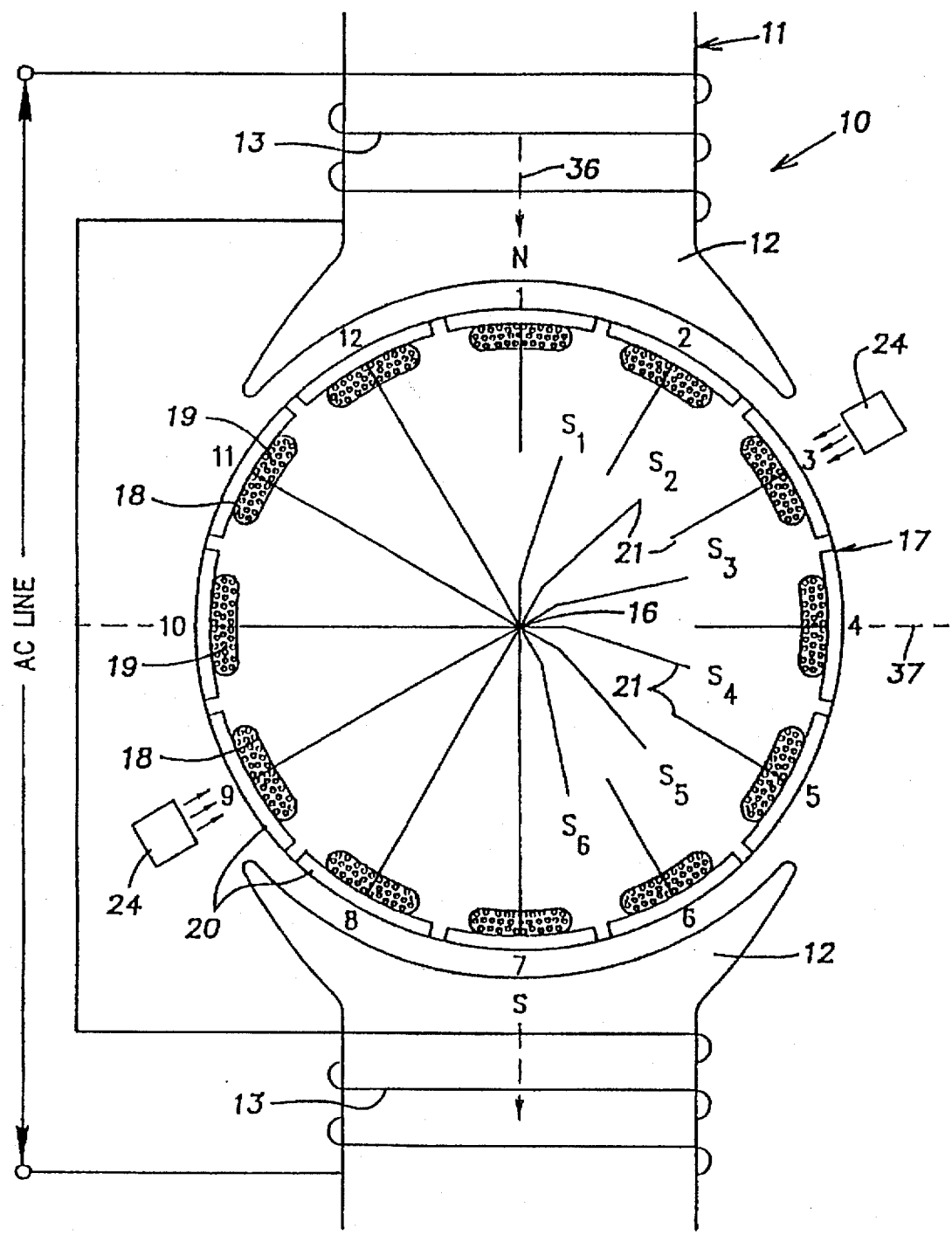
FIG. 1 is diagrammatic axial view of a two-pole repulsion motor constructed in accordance with the present invention.

An electric motor 10 constructed in accordance with the invention is diagrammatically illustrated in FIG. 1 in a view looking axially from an electronic commutator end. The motor device 10 in the illustrated example is a single-phase two-pole repulsion motor. A motor stator 11 comprises a pair of diametrally opposed magnetic poles 12 having field windings 13 that typically are connected to 60 HZ single-phase utility power. The field windings produce a magnetic field that is in a direction indicated by an imaginary line or axis 36 extending from one pole 12 to the other. The stator 11 can be constructed in essentially the same manner as is a conventional universal series motor or a repulsion motor.

A rotor or armature 17 of the motor 10 can be constructed essentially in the same manner as a conventional universal series motor with certain exceptions or modifications discussed below. The rotor is supported for rotation about a central axis 16 by axially spaced bearings mounted on opposite ends of the stator in a conventional manner, for example. The rotor 17 has a plurality of axial or longitudinal slots 18 on its periphery into which are fitted a plurality of generally longitudinal coils 19. Typically, the coils 19 have many turns and each slot 18 receives the sides of more than one coil 19. The coils 19 are terminated on commutator segments or bars 20 in accordance with conventional practice as will be understood from the description below. Additionally, the coils 19 can be terminated in other convenient ways since the invention eliminates the regular commutating service of the segments or bars 20. It will be understood from this discussion that electrical brushes such as are found in conventional repulsion motors or in universal series motors are eliminated from the construction of the motor. The motor 10 operates generally like known repulsion motors except that it includes electronic means on the rotor 17 to short the ends of the rotor winding coils 19 and thereby eliminates the need for conventional electrical brushes to do the same.

The commutator segments or coil terminations 20 are typically arranged in diametrically opposed pairs and for the purpose of the explanation of the invention, but not by way of limitation, there are twelve segments or coil termination points illustrated in certain of the disclosed constructions. Associated with each pair of segments 20 is an electronic switch circuit 21 diagrammatically represented at 21 in FIG. 1 and in component form in FIG. 2. In elementary terms, it will be understood from the description below that at appropriate times in the rotation of the rotor 17, electronic switches will be individually closed or rendered conductive to short, i.e. electrically connect their respective segments 20 together. As with conventional repulsion motors, with the field windings 13 energized and appropriate commutator segments 20 shorted, the effect is to develop torque and rotation between the rotor 17 and stator 11.

Figure 2:
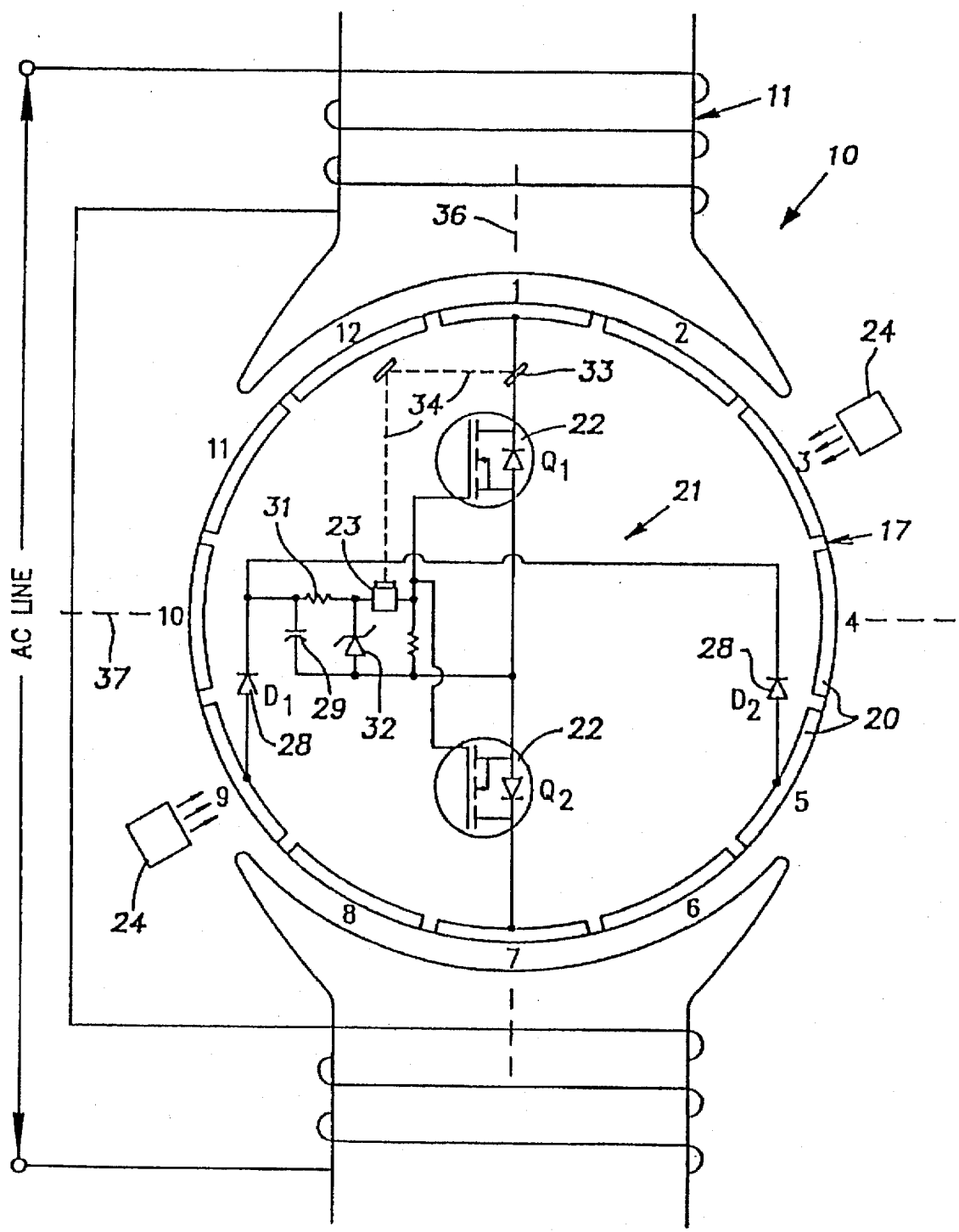
FIG. 2 is a diagram of an electronic circuit, in accordance with the invention, that serves to selectively shunt a typical pair of opposed commutator segments, or their equivalents for winding termination, in place of the action of a pair of conventional electrical brushes, it being understood that one such circuit is provided for each pair of opposed commutator bars or segments.

With reference to FIG. 2, a typical electronic switch circuit 21 comprises a pair of power MOSFET transistors 22 and a triggering device such as a phototransistor 23. The output terminals of the power transistors 23 are connected individually to the diametrally opposed segments 20 numbered, clockwise, 1 and 7 while their inputs are connected in common. The phototransistor 23 and power transistors 22 are energized by related electronic circuitry comprising a pair of diodes 28, a capacitor 29, a resistor 31 and a zener diode 32. The inputs of the diodes 28 are connected to segments 20, numbered 5 and 9, other than the segments 20 (1 and 7) associated with the power transistors 22. Since voltages vary between various armature windings during rotation of the rotor 17, a voltage (limited by the zener diode 32) is developed on the capacitor 29 sufficient to operate the phototransistor 23 and power transistors 22. When the phototransistor 23 is illuminated by a suitable light source 24, it switches on and, in turn, switches on the power transistors 22 through their gates placing them in a conductive state.

The electronic switch 21, with its associated circuitry illustrated in FIG. 2, is replicated for each pair of segments 20, but for clarity in the drawings, this replication is not shown. It will be understood that the electronic switches 21 and related energizing circuitry for all of the segment pairs 20 are suitably fixed to the rotor so that the same rotates in unison with the rotor. For heat transfer or other reasons, the electronic switch components and related circuitry can be carried on the rotor outside of the stator by interconnecting the same to the segments 20 with wires that run along the rotor shaft, in a slot or central hole, through the associated conventional shaft bearing.

For purposes of explanation, with reference to the embodiment of FIGS. 1 and 2 and like embodiments, it will be assumed that the angular extent and relationship, with reference to the axis of rotation of the rotor 17 of the segments 20 to the armature coils 19 is like that of a conventional repulsion or universal series motor and, further, that the phototransistors 23 each have a window or light receptor, in an angular sense, that is centered at a bisector of the arc of an associated segment 20 and have a field of view, in the angular sense, generally coextensive with the arcuate extent of a typical commutator segment 20. That is, the angular location of each light receiving means for a phototransistor 23 is at the same angular center as in associated segment 20. In FIG. 2, the light window or receiving means is shown diagrammatically as a mirror 33 in a light path 34 to the phototransistor 23. Other control signal receiving arrangements include prisms, fiber optics or the direct positioning of the phototransistor 23 at the actual angularly centered station for receiving a control signal from the light source 24. In this embodiment, all of the signal receiving means in the form of mirrors 33 and the light source 24, which is duplicated at diametrally opposite points, all lie in a common plane transverse to the axis of rotation of the rotor 17. Consequently, the circular path or orbit of each signal receiving mirror means 33 for each set of commutator segments 20 is the same as that of the others.

The light sources 24 provide a pair of diametrally opposed position reference markers and are suitably mounted or supported on the stator 11 at approximately the 2 o'clock and 8 o'clock positions in the showing of FIG. 2. These reference markers 24, when the electronic circuit 21 includes a phototransistor 23 or other light sensitive device, comprise known devices such as a light emitting diode (LED) or an incandescent bulb powered by the AC line and any necessary power supply. The position reference markers or light sources 24 are located so that the light signal or radiation emitted from them shines in a beam that radially intersects the path or orbit of the signal receptors or mirrors 33 for the phototransistors 23. With the stator windings 13 and reference marker light sources 24 energized, the relevant electronic switch 21, represented by $S_3$ in FIG. 1 will cause its associated segments 20 (numbered 3 and 9) to be shorted. This results from the light of the reference marker 24 energizing the phototransistor 23 to energize the associated power transistors 22.

Analogous to the situation in a conventional repulsion motor, when a pair of segments 20, in an angular position other than aligned with a hard neutral axis 36 corresponding to the 12 o'clock/6 o'clock locations or aligned with a soft neutral axis 37 corresponding to 3 o'clock/9 o'clock locations are shorted and the stator windings 13 are energized with an AC voltage, the rotor 17 will develop a torque and will rotate. In the case illustrated in FIG. 1, the electronic circuit represented by the symbol $S_3$ is activated by the light source 24. In the showing of FIGS. 1 and 2 where the reference marker lights 24 are disposed approximately at the 2 o'clock and 8 o'clock positions, torque and rotation of the rotor 17 will be induced in a clockwise direction. As the light signal receiving mirror 33 associated with the circuit $S_3$ moves away from the influence of the reference marker light 24, the signal receiving mirror 33 of the adjacent circuit $S_2$ moves into such influence and rotor rotation is thereby continued. A study of FIG. 1 reveals that each circuit $S_1$ will be energized for shorting its respective segment pairs 20 twice each revolution—once at each arrival of the mirror 33 at the diametrally opposed reference marker light sources 24.

From the foregoing it will be understood that the circuits $S_1$–$S_6$ in combination with the reference marker light sources 24 perform the segment shorting function previously performed by electric brushes and commutator segments in conventional repulsion motors.

Like the action in a conventional repulsion motor, where the angular position of the reference marker lights 24 is moved away from the 2 o'clock/8 o'clock position counter clockwise towards the hard neutral axis 36, the torque and speed developed by the motor generally increases. With the lights 24 very close to hard neutral axis 36, torque decreases and is zero when centered at this location. Where the lights 24 are moved clockwise from the 2 o'clock/8 o'clock position past the soft neutral axis 37 to the 4 o'clock/10 o'clock positions, the rotor rotates in the opposite direction, i.e. counter clockwise with torque and speed increasing with increasing angular displacement of the brushes from the neutral axis 37.

Figure 3:
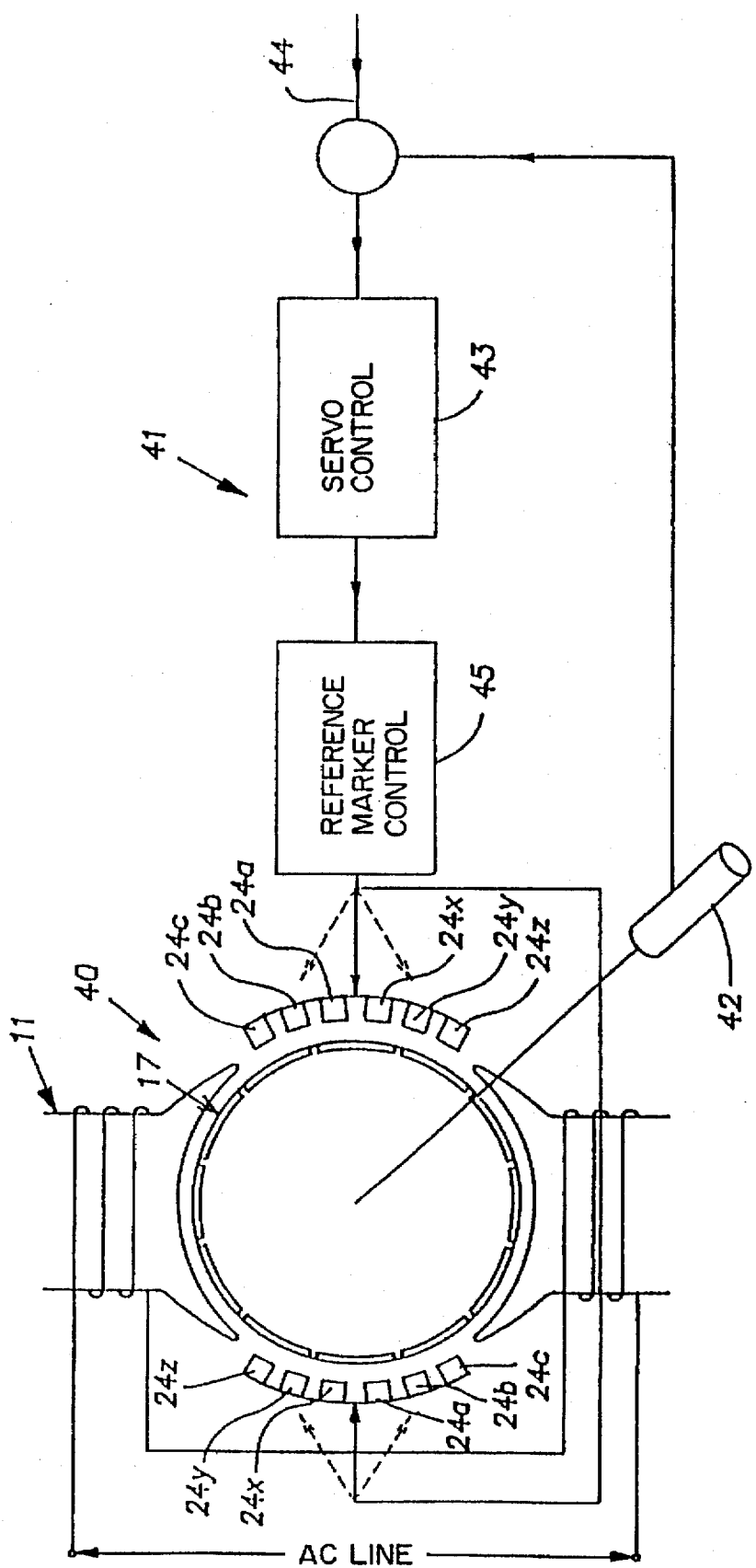
FIG. 3 is a schematic diagram of a repulsion motor and related servo-control circuit in accordance with the invention.

The variable torque, speed and directional characteristics of the repulsion motor of the present invention make it particularly suited as a servomotor 40. FIG. 3 is a diagrammatic representation of such a unit. The armature or rotor 17 and stator 11 of the motor 40 are essentially the same as that described in connection with FIGS. 1 and 2 except for the reference marker or light source arrangement 24. In the present structure, a plurality of pairs of diametrally opposed of reference marker light sources 24a–24c, 24x–24z are disclosed circumferentially about the rotor. Typically, the reference markers 24 all lie in a plane transverse to the axis of the rotor 17 and common to the signal receivers or mirrors 33. FIG. 3 illustrates a servocontrol circuit 41 for operating the motor 40. The speed, direction and angular position of the rotor or armature shaft is monitored by a transducer 42 that produces a signal to a servocontroller 43. A speed/position input command signal is applied to a line 44 to the servocontroller 43. The servocontroller 43 compares the reference or command signal on the line 44 with the measured signal from the transducer 42 and produces a control signal to a reference marker control 45. This reference marker control 45, in turn, activates an appropriate diametrally opposite pair of the reference markers 24a, 24b or 24c and 24x, 24y or 24z to produce a desired rotational direction, torque and/or speed of the motor rotor 17. It will be understood that the relative location of the active pair of reference markers 24 determines the speed, torque and direction of the rotor. As discussed above, the reference markers 24c and 24z closest the hard neutral axis 37 of the poles 12 generally producing high torque and speed, when activated, as compared to the reference markers 24a, 24x nearest the soft neutral axis 37. Thus, as the error signal between the command signal and the feedback transducer signal increases (in either polarity), the servocontrol will switch to the next pair of reference marks 24 in the array from the axis 37 towards the pole axis 36. Conversely, as the error signal reduces, the reference marker control shifts to a pair closer to the axis 37.

A variation in the construction of the servomotor 40 is the provision of a single pair of reference markers 24 that are supported for movement about an arc concentric with the rotor and are mechanically moved by an actuator controlled by the reference marker control. Other variations in the servomotor are contemplated. For example, the control of the light emitting diodes represented by the light sources 24 can be embodied as just the two pairs at the extreme ends of the arcuate array, i.e. 24c and 24y. The torque control can be achieved by pulse width modulation of the current through the LED. When the error signal increases, the LED is pulsed on for a longer time duration.

Figure 4:
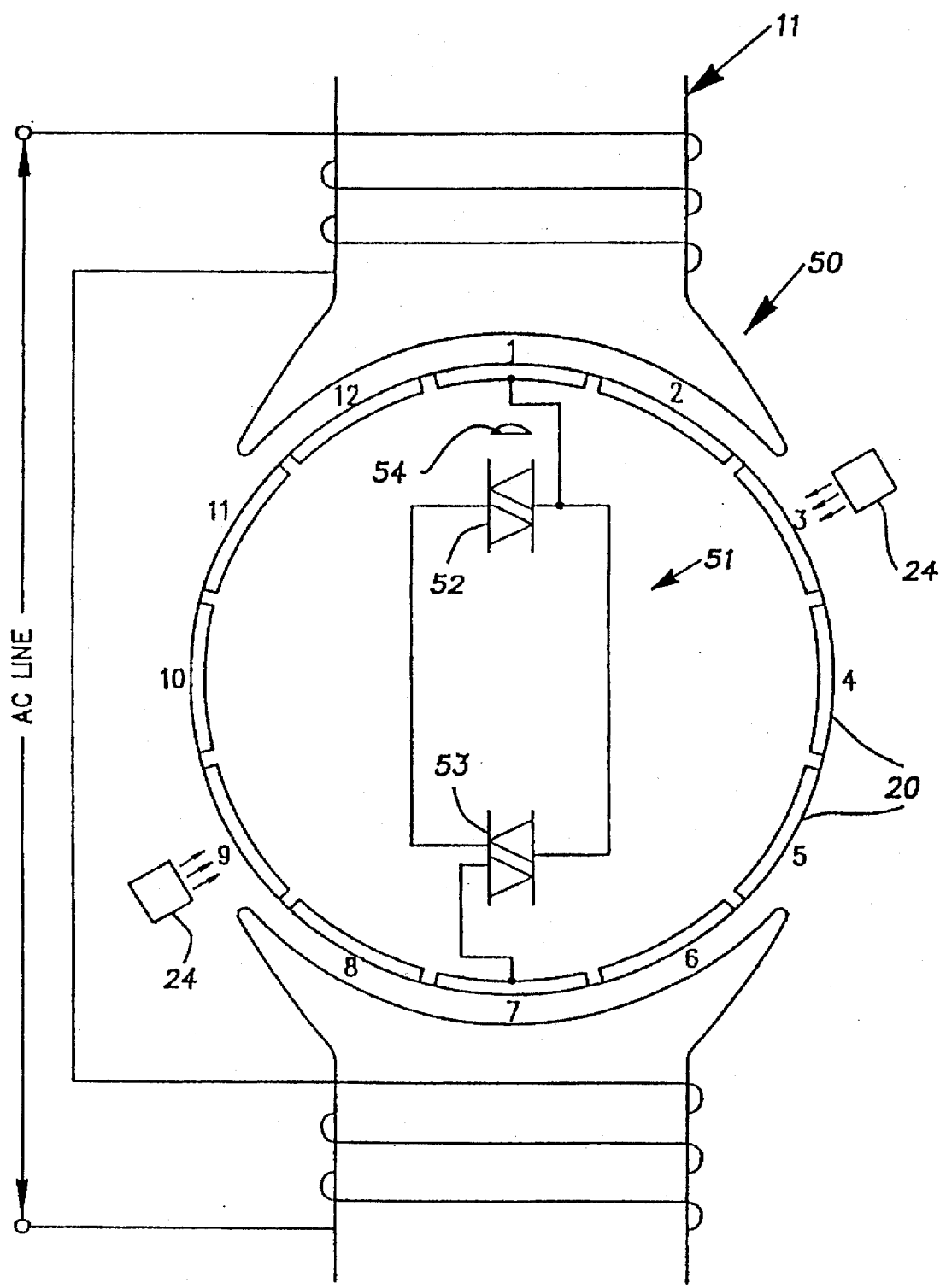
FIG. 4 is a view similar to FIG. 2 showing a different electrical circuit for each pair of opposed commutator segments.

FIG. 4 illustrates an electronic switch circuitry 51 that can be substituted for the electronic switch circuitry for the commutator pairs in place of the electronic switch circuitry 21 of FIG. 2. It has been found that the circuitry 51 when used in replication for circuits $S_1$-$S_6$ of FIG. 1 produces a synchronous motor 50. The circuitry 51 includes a phototriac 52 and an alternistor 53. Specifically, it has been found that the rotor 17 will lock onto a rotational speed that is an integral multiple of the power supply frequency. For example, if the supply frequency is the 60 HZ commercial power line and the motor is a two pole machine, then the synchronous speed will be 3600 rpm. If a four pole machine is constructed, the speed will be 1800 rpm. If the power supply frequency is adjustable, the synchronous speed will be a fixed multiple of that frequency.

The alternistor 53 is composed of two SCR's back-to-back in the same package. An alternistor has the advantage over a triac when switching inductive loads in that a snubber network is not usually required. As shown in FIG. 4, the alternistor 53 has each one of its conduction electrodes on a commutator segment (e.g. 1, 7) that is diametrically opposite the other. The phototriac 52 has its light receiving area schematically designated at 54. Similarly to the circuit operation described in connection with FIG. 2, the switch 51 will be activated twice per each revolution of the rotor where two LEDs or reference markers 24 are provided. When the rotor 17 moves and the phototriac 52 has passed the area of influence of the LED 24, the switch 51 will remain in conduction until the current is reduced to near zero or attempts to reverse. This turn-off is controlled by the voltage induced in the rotor windings 19 presented to the commutator segments or bars 20. The voltage is determined by the line power and the rotor motion. Because of the nature of the devices 52, 53, a synchronization mode is created and the rotor 17 locks into the frequency. A motor provided with the circuitry of FIG. 4 will run at the synchronous speed as the load torque increases until a breakdown point. Thereafter, the motor will run at a speed that is lower than synchronous as the load torque increases. This motor has the advantage over other kinds of synchronous motors that operate from a single phase power supply in that it has a relatively large starting torque. As previously indicated, there are many ways, moreover, to control the LED light source 24 to alter the performance curve of the motor.

Figure 5:
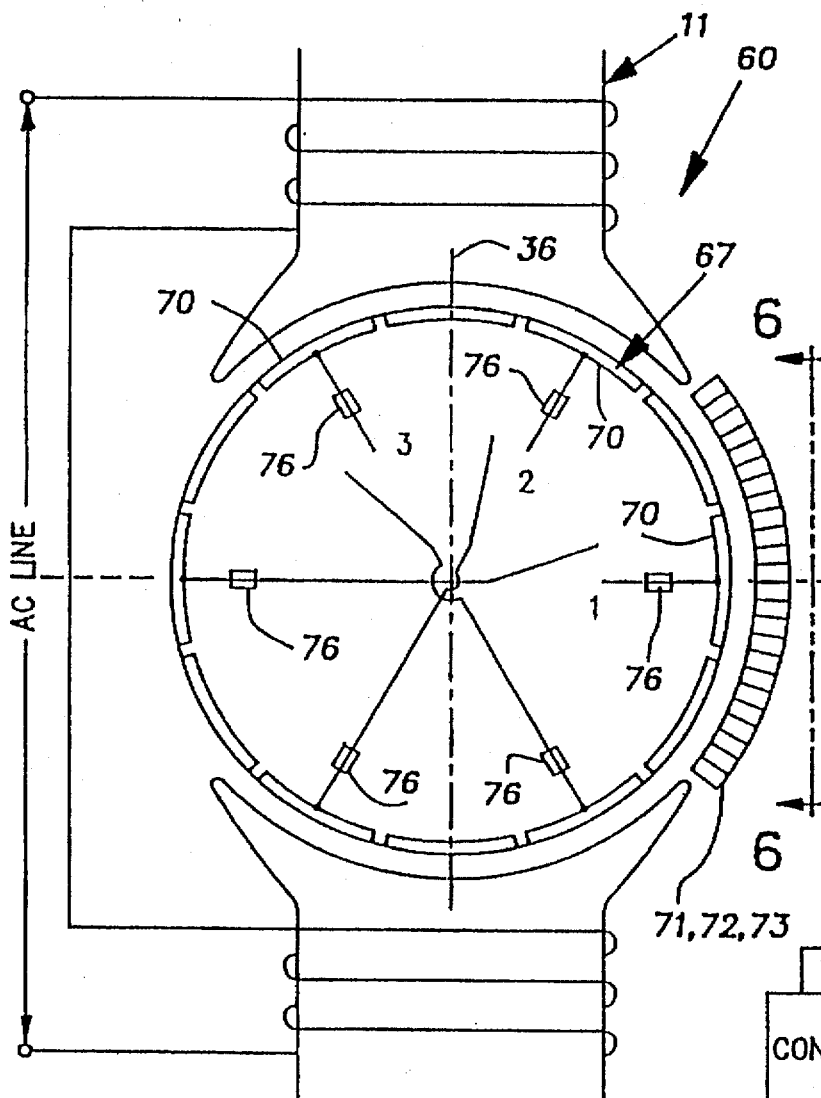
FIG. 5 is a diagrammatic representation of a repulsion motor useful as a stepping motor.
Figure 6:
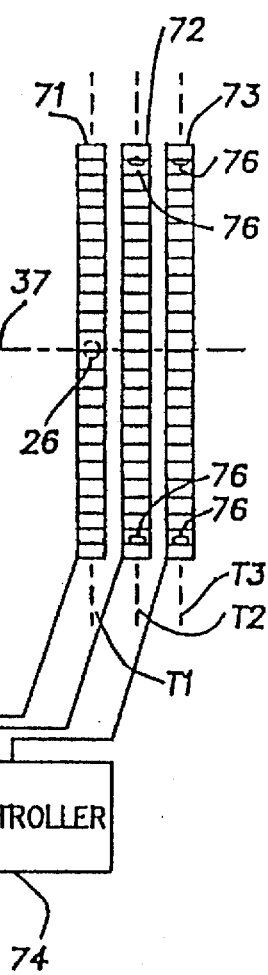
FIG. 6 is a diagrammatic view of a portion of the motor of FIG. 5 taken from the view 6—6 indicated in FIG. 5.

Reference is now made to FIGS. 5 and 6 where a repulsion motor 60, using the principles of the invention, is constructed with stepping motor characteristics. The motor 60 is similar in arrangement to that described in connection with FIGS. 1 and 2 as it pertains to a stator 11 and rotor 67. Electronic switches $S_1$, $S_2$ and $S_3$, such as shown in FIG. 2, are associated with commutator segments 70 that are spaced 60° apart on the circumference of the rotor. As before, it will be understood that signal responsive or sensing devices 76 (such as a light guide or the lens of a photosensitive device) are angularly centered with respect to a corresponding commutator bar or segment 70. In this embodiment, however, each electronic switch $S_1$-$S_3$ has two diametrically opposed signal sensing devices 76 and the sensing devices of each electronic switch $S_1$, $S_2$ and $S_3$ rotate in a separate track or path $T_1$, $T_2$ and $T_3$. The circumferential tracks or paths $T_1$-$T_3$ of the individual pairs of sensing devices 76 are axially displaced from one another as indicated in FIG. 6. For each switch circuits $S_1$, $S_2$ and $S_3$, and each pair of associated sensing devices 76, there is a separate energizing light signal source 71, 72 and 73. Each signal source 71-73 extends through an arc of 120° about the circumference of the path of its respective signal sensing devices 76. Since each circuit $S_1$-$S_3$ has a pair of diametrically opposed sensing means 76, a signal source 71-73 need only be provided on one side of the rotor or armature. The signal sources 71-73 are appropriately mounted or fixed relative to the stator.

Each energizing signal source 71, 72 or 73 is comprised, for example, of a plurality of discrete LEDs that collectively cover a full 120° of arc. A study of FIG. 6 shows that in rotation of the rotor, the sensing devices or photodetectors 76 of each electronic circuit sweeps in its track $T_1$, $T_2$ or $T_3$ in a path axially aligned with an associated LED array 71, 72 or 73.

In operation, only one light array 71, 72 or 73 is operated or switched on by a controller 74 at any time. Where the LED array 71 associated with $S_1$ is activated, the rotor 67 moves to the position illustrated in FIG. 5 where the associated sensor 76 and commutator segment 70 is aligned with the neutral axis 37. When the LED array 72 for $S_2$ is switched on, $S_2$ becomes closed or conductive and the rotor 67 will move to a position where its sensor 76 is aligned with the neutral axis 37. Then, if the array 72 is turned off, then the array 73 is turned on, the rotor 67 will move to a position with the $S_3$ sensor 76 in line with the neutral axis 37. From the foregoing, it will be evident that full rotation of the rotor 67 or reverse rotation is achieved by repeating or reversing the cycle of operation of the arrays 71-73. The number and location of the electrical switches $S_1$-$S_3$ and number of arrays 71-73 can be varied to meet the demands of a particular application. The motor 60, or others with similar construction, can be used in applications where conventional stepping motors are used.

The repulsion stepping motor 60 can be used as a synchronous variable speed motor by controlling the rate or frequency by which the LED array 71-73 are switched on and off. In this case, the control or amplifier 74 controls the power to the LED arrays 71-73 which may be in the order of milliwatts and the motor 60 can develop hundreds of watts. In typical present day stepping motors, all of the motor power passes through the control electronics.

The electronically controlled switch $S_1$ of the various disclosed embodiments can be implemented in many ways besides those disclosed that operate with phototransistors or other photoresponsive devices. Other non-contact devices include Hall effect transistors that sense a magnetic field that can be produced by a permanent magnet or an electromagnet that substitutes for a light source.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention. An example of a variation is a construction where a signal to the electronics for selectively shorting a coil is developed by a commutator and brush set with the current through the brushes being essentially limited to that necessary for an adequate signal.

I claim:

1. A repulsion motor comprising a stator and a rotor rotatably mounted on said stator for rotation about an axis, the stator having at least one pair of poles, a field winding on said stator for producing a field in said rotor, a plurality of coils on said rotor adapted to electromagnetically interact with the field of the stator winding, switching means on said rotor to selectively short successive ones of its coils when they are in angular positions relative to said stator poles where the stator field is effective to induce a current in said coils and produce a resultant relative rotation between the rotor and stator.

2. A repulsion stepping motor comprising a stator and a rotor rotatably mounted on the stator, the stator having a pair of poles, a field winding on said stator for producing a magnetic field between said poles in said rotor, a plurality of coils angularly distributed about said rotor and adapted to electromagnetically interact with the filed of the stator winding, switch means on the rotor for selectively shorting said coils, and control means for operating said switch means to align a selected one of said coils with an axis fixed by reference to the axis of the magnetic field of said poles.

* * * * *